(12) United States Patent
Yamashita et al.

(10) Patent No.: US 6,270,833 B1
(45) Date of Patent: Aug. 7, 2001

(54) SEPARATOR FOR AN ALKALINE CELL AND A METHOD OF PRODUCING THE SEPARATOR

(75) Inventors: Katsuhiro Yamashita; Shuji Murakami; Kiyohide Tsutsui; Hirohiko Ota, all of Tokyo (JP)

(73) Assignee: FDK Corporation, Tokyo (JP)

( * ) Notice: Subject to any disclaimer, the term of this patent is extended or adjusted under 35 U.S.C. 154(b) by 0 days.

(21) Appl. No.: 09/270,769

(22) Filed: Mar. 17, 1999

(30) Foreign Application Priority Data

May 28, 1998 (JP) .................................................. 10-147418
Sep. 9, 1998 (JP) .................................................. 10-254814

(51) Int. Cl.$^7$ ................................................. H01M 2/18
(52) U.S. Cl. ........................ 427/58; 427/121; 427/179; 427/421; 493/308; 429/133
(58) Field of Search .................... 493/308; 429/253–255, 429/133; 427/58, 121, 179, 421; 29/623.1, 623.2, 623.4, 623.5

(56) References Cited

U.S. PATENT DOCUMENTS 4,620,665 * 11/1986 McSherry .

FOREIGN PATENT DOCUMENTS 49-114045 * 10/1974 (JP) .
57-124850 * 8/1982 (JP) .
58-82465 * 5/1983 (JP) .

* cited by examiner

Primary Examiner—W. L. Walker
Assistant Examiner—David Sorkin
(74) Attorney, Agent, or Firm—Crowell & Moring, L.L.P.

(57) ABSTRACT

A new separator for an alkaline cell is provided, which can prevent deformation to an end of the separator and also prevent short circuits within the cell structure when an external force is added to the cell. The separator has a characteristic that a ratio of a tensile strength of a longitudinal direction of a separator base paper and a tensile strength of a widthwise direction of the base paper is within a range of 2/1 to 1/1. The invention provides a new method of producing the separator. The method permits reliability in sealing properties of a closed bottom end and high productivity. The method has the steps of: winding the base paper to form a cylindrical body; subjecting the cylindrical body to a closed bottom forming step while the cylindrical body is held by a clamping device to maintain its cylindrical shape; heat-bonding an end of the cylindrical body to close the end; and releasing the cylindrical body from the cylindrical clamping device.

5 Claims, 5 Drawing Sheets

FIG. 5A
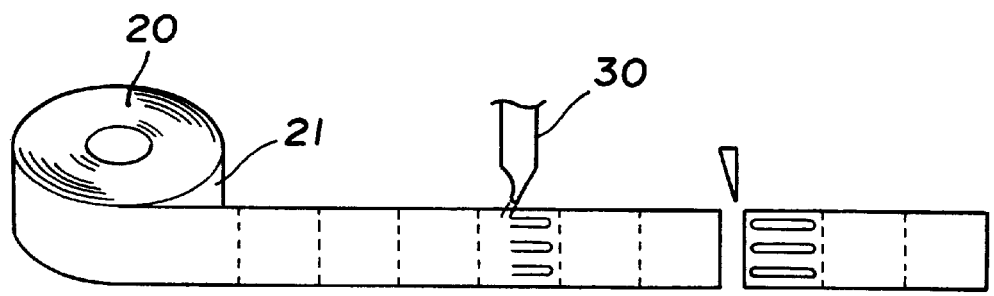
FIG. 5B  FIG. 5C  FIG. 5D
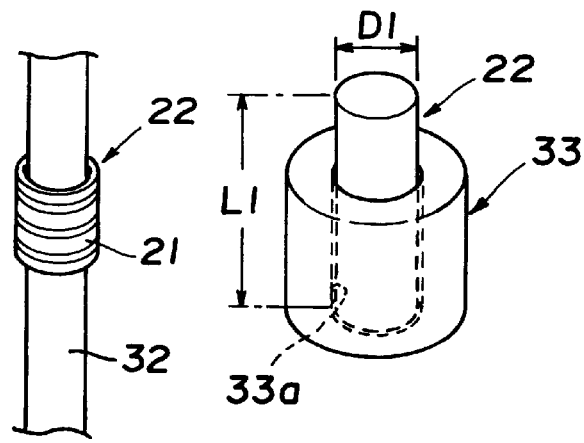
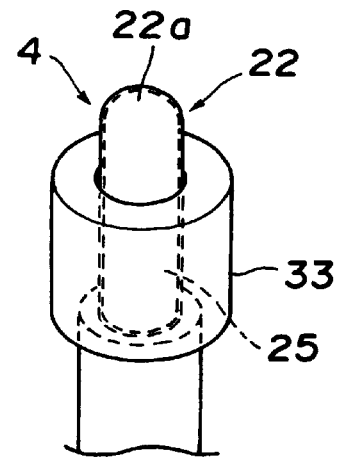

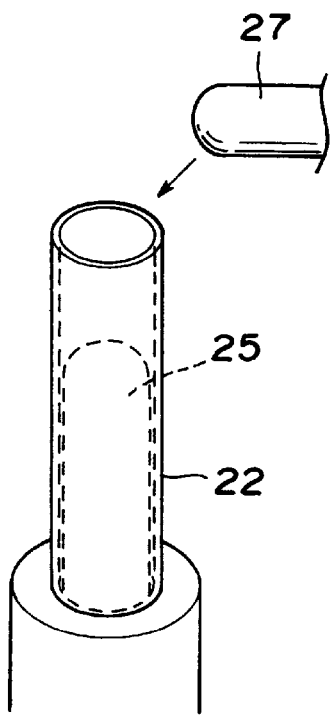
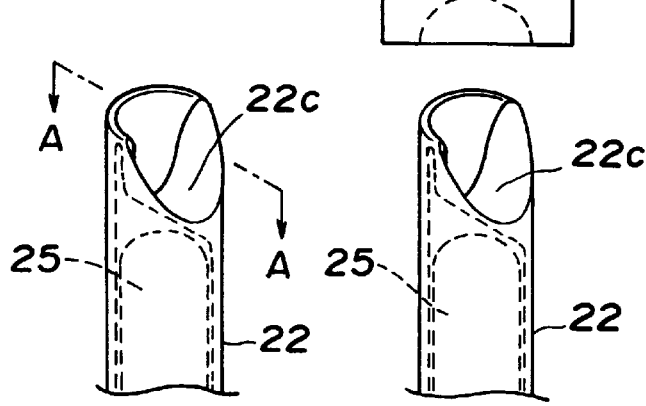
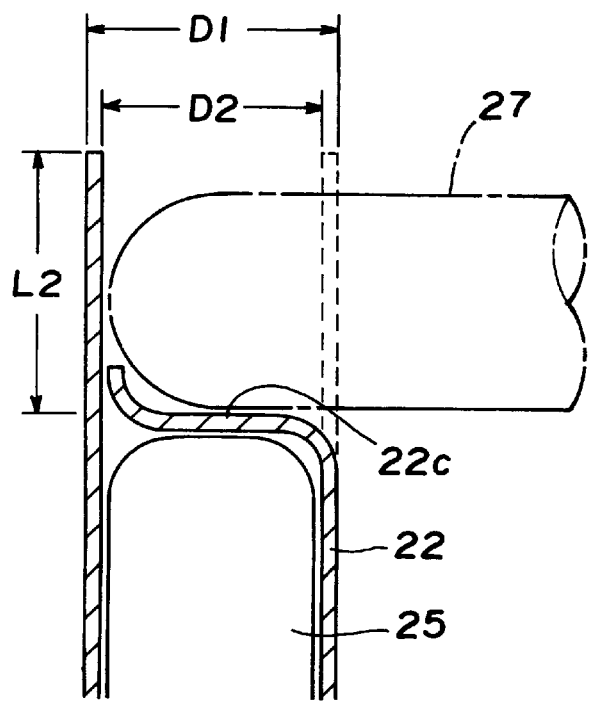

SEPARATOR FOR AN ALKALINE CELL AND A METHOD OF PRODUCING THE SEPARATOR

BACKGROUND OF THE INVENTION

The present invention relates in general to an alkaline cell and more particularly to a separator for the alkaline cell and a method of producing the separator.

Generally known alkaline cells such as LR-6 type alkaline cells have, as illustrated in FIG. 1, a cylindrical casing 2 having a bottom end for serving as a cathode, an electrically conductive membrane (not shown), three cylindrical cathode mixes 3 piled within the cathode cylindrical casing 2, a cylindrical separator 4 having a bottom end, an electrolyte in both the separator 4 and the cathode mixture 3, and an anode active mass 5 of zinc in the form of gel.

The cathode metal casing 2 has an opening to which a closure body 6 is mounted snugly. The sealing body 6 has an anode terminal 7, a current collector 8 fixed to an inner central portion of the anode terminal plate 7 by spot welding and the like, a gasket 9 fitted to the current collector 8 with a sealing material disposed therebetween, and an annular sealing cap 11 firmly fitted to the opening of the cathode casing 2. When the current collector 8 is inserted into the anode active mass 5 of gel-like zinc anode material 5, an end 4A of the separator 4 is pressed inside by the gasket 9 to be bent inside, and while the separator end 4A is bent inside, an end of the opening of the cathode casing 2 is caulked and an outer circumferential portion of the gasket 9 is clamped between the outer circumferential portion of the anode terminal plate 7 and an end of the cathode casing 2, so that the opening of the cathode casing 2 is sealed by the closure body 6.

On an outer surface of the cathode metal casing 2, there is provided a label 12 which has recently replaced the conventional metal jacket for the purpose of increasing the inner volume of the cell and referred to as "shrink tack label" or simply "label", and an annular anode washer 13 is disposed between an outer circumferential portion of the anode terminal plate 7 and the label 12.

With reference to FIG. 2, the separator 4 has been produced by rotating a roll 20 of a base paper 21 for the separator by pulling an end of the roll paper in its longitudinal direction and cut into a predetermined length in accordance with a length (height) of a separator to be formed, and then the base paper 21 of the predetermined length is rotated in the horizontal direction in the drawing by means of a mandrel (not shown) to form a cylindrical structure as illustrated. The cylindrical base paper 21 is then heat-bonded at its side portion and bottom portion to form a cylindrical structure having a closed bottom end. This conventional method of producing the separator base paper 21 must be turned at right angle to change its moving direction from the cutting step to a winding step in which the cut base paper is wound and adhered to form a cylindrical structure and its production rate is limited at most to 100 pieces per minute.

Therefore, if it is necessary to produce about 600 separators 4 per minute, as shown in FIG. 3, a roll 20 of a separator base paper 21 is rotated in the horizontal direction to pull the base paper in the longitudinal (horizontal) direction and then cut into a predetermined length, and the cut base paper is rotated in the horizontal direction by using a mandrel wound into a cylindrical form, and then the cylindrical base paper is heat-bonded at its side and bottom end portions so that a cylindrical structure with a closed bottom end is formed for a cylindrical separator. This method does not require any change of moving direction of the base paper 21 from the cutting step to the winding step and, consequently, the production can be enhanced.

However, in the production method of FIG. 3 in which the base paper 21 is rotated in the horizontal direction and pulled in the longitudinal direction to be cut and then rotated in the horizontal direction, an axial direction of the separator 4 is coincided with a width direction of the base plate 21 of the roll 20 and, therefore, the cylindrically formed separator is likely to be deformed when the end 4A (FIG. 1) of the separator 4 is pressed radially inwardly by pushing the end 4A by the gasket 9 of the closure body 6. If such deformation is generated, the gel like zinc anode active mass 5 is moved into the cathode active mass 3 through a gap between the separator 4 and the gasket 9 when a shock or vibration is added to the alkaline cell 1, resulting in generation of short circuits.

An example of the production method of the separator shown and described with reference to FIG. 3 will be described more specifically with reference to FIGS. 4A, 4B, 4C and 4D. In FIG. 4A, a base paper 21 in the form of a roll 20 is cut into a predetermined dimension and the cut base paper 21 is wound to form a cylindrical body 22 and then directed to a bottom forming step by a suitable feeding device (not shown) and one end of the cylindrical body is subject to a heat bonding to provide a closed bottom end.

In order to provide a reliable sealing effect of the closed bottom end, the end portion of the cylindrical body is bent prior to the heat bonding. Namely, as shown in FIG. 4B, a shaft 25 is inserted through the cylindrical body 22 and a blade-like die 24 is pressed downward against the upper end of the cylindrical body 22 to form a depression 22b as shown in FIG. 4C, and then a heat curl die 29 is pressed against the depressed upper end of the cylindrical body 22 as shown in FIG. 4D so that a semispherical end 22a is formed as illustrated in FIG. 4E. Thus, the conventional separator 4 was obtained.

However, there are some inconveniences and difficulties in the conventional production method of the separator.

First, the cylindrical body 22 must be fed to a predetermined position by means of a feeder and, therefore, it is likely that the opening end portion of the cylindrical body 22 is accidentally deformed or collapsed during the feeding transporting operation due to some mechanical factors and/or shocks applied to the cylindrical body 22, resulting in serious reduction of productivity.

Second, when a depression 22b is formed on top of the cylindrical body 22, it depends largely upon the physical properties, as hardness, of the cylindrical body 22 and there are cases that it is difficult to form a desirable depression and, therefore, a sealing (blocking) property of the closed bottom end 22b is not complete or satisfactory. If a depression 22b is forcibly formed by adjusting the time and pressure of the blade-like die 24 against the top end of the cylindrical body 22, it sometimes results in damages of the cylindrical body and reduction of productivity. Thus, a care must be taken to select definitely the material for the base paper for the separator but this is troublesome and requires additional time and labor.

SUMMARY OF THE INVENTION

An object of the present invention is to provide a new separator for an alkaline cell, which can prevent any deformation to an end of the separator and also prevent short circuit within the cell structure when a shock or any other external force is added to the cell.

Another object of the present invention is to provide a new method of producing a separator for a battery or a cell such as an alkaline cell which permits reliability in sealing properties of the bottom end portion and high productivity of the separator.

In order to satisfy the first object of the invention, there is provided a separator for an alkaline cell, wherein the cell has a cylindrical cathode metal casing, a cathode mix mounted within the cathode metal casing, a separator which is formed by rotating a roll of a separator base paper 21 to be pulled out and cut to a predetermined length and then the separator base plate is rotated in the horizontal direction to form a cylindrical structure, an electrolyte dipped into the separator and the cathode mix, an anode active mass filled in a hollowed space of the separator 22, a closure body having a gasket and fitted to an opening of the cathode metal casing so that an end of the separator is bent radially inwardly by the gasket, wherein the separator 22 has a characteristic that a ratio of a tensile strength of a longitudinal direction of the separator base paper and a tensile strength of a width direction of the separator base paper is within a range of 2/1 to 1/1.

The separator referred herein intends to mean a various kinds of separators including a cylindrical separator having an unitarily closed bottom end which is described above, and other type of separators as a cylindrical separator having no integral closed bottom end. In the latter case, a cup shaped plate or another separator member can be used to apply to the opened bottom end to close the bottom end.

According to the separator of the present invention, fibrous orientation of the separator base plate is loosened or released so that a ratio of a tensile strength of a longitudinal direction of the separator base paper and a tensile strength of a width direction of the separator base paper is within a range of 2/1 to 1/1. By this structure, the top end portion of the separator is not deformed or damaged even when the separator is adapted to a cell of the type in which the opened end portion of the separator is bent radially inwardly by the gasket of the closure body. Accordingly, there is no fear or danger of generation of short circuits within the cell even when an external force such as shock or vibration is added to the cell. Consequently, productivity of the separator and also the cell can be improved.

The second object of the present invention will be satisfied by providing the production method which comprises the steps of:

winding a base paper 21 for a separator to form a cylindrical body 22, subjecting the thus formed cylindrical body 22 to a closed bottom forming step while the cylindrical body 22 is held by a cylindrical clamping jig device 33 to maintain its cylindrical shape, heat treating an end of the cylindrical body to close the end to thereby form a closed end, and releasing the cylindrical body 22 from the cylindrical clamping jig device 33.

In the method described above, it is preferred that the cylindrical clamping jig device 33 has a holding hole 33a having a diameter which is substantially same as or slightly larger than an outer diameter D1 of the cylindrical body 22, and a length which is larger than a half of a length L1 of the cylindrical body 22.

In a preferred embodiment, the cylindrical body 22 is formed such that water is sprayed to a predetermined portion of the base paper which contains a water soluble binder, and the base paper is then wound to a cylindrical form. A heat plate is applied to a predetermined water-sprayed portion of the cylindrically formed base paper to evaporate the water and, at the same time, to proceed hot press bonding of the base paper. The water soluble binder may be selected from polyvinyl alcohol (PVA), polyacrylic sodium (NaPA), etc.

In a preferred embodiment, the upper and lower portions of the winding end of the cylindrical body 22 are sprayed with water so that the sprayed portion has a length, which is longer than an actual circumferential length of the cylindrical body.

In the present invention, when an end of the cylindrical body 22 is closed by a heat bonding method, a rod-like jig 27 may be obliquely pressed against the end of the cylindrical body 22 to depress one side portion 22c of the end of the cylindrical body 22 and bend to fold the portion 22c at right angles and, at this moment, a heat curl 29 is pressed against the end of the cylindrical body 22 to proceed a heat bonding.

Further, in the present invention, it is preferred that a length L2 of the folded portion of the cylindrical body 22 is longer than an inner diameter of the cylindrical body 22.

BRIEF DESCRIPTION OF THE DRAWING

FIGS. 5A, 5B, 5C and 5D are diagrams showing the steps of forming a separator according to the present invention.

FIGS. 6A, 6B and 6C are diagrams showing the step of forming a closed end portion of the cylindrical separator.

FIG. 7 is an enlarged sectional view of the separator taken along line A—A in FIG. 6B.

PREFERRED EMBODIMENTS OF THE INVENTION

1. Separator Structure:

Example 1

First, an alkaline dry cell of LR-6 type will be explained which was produced as follows.

Figure 1:
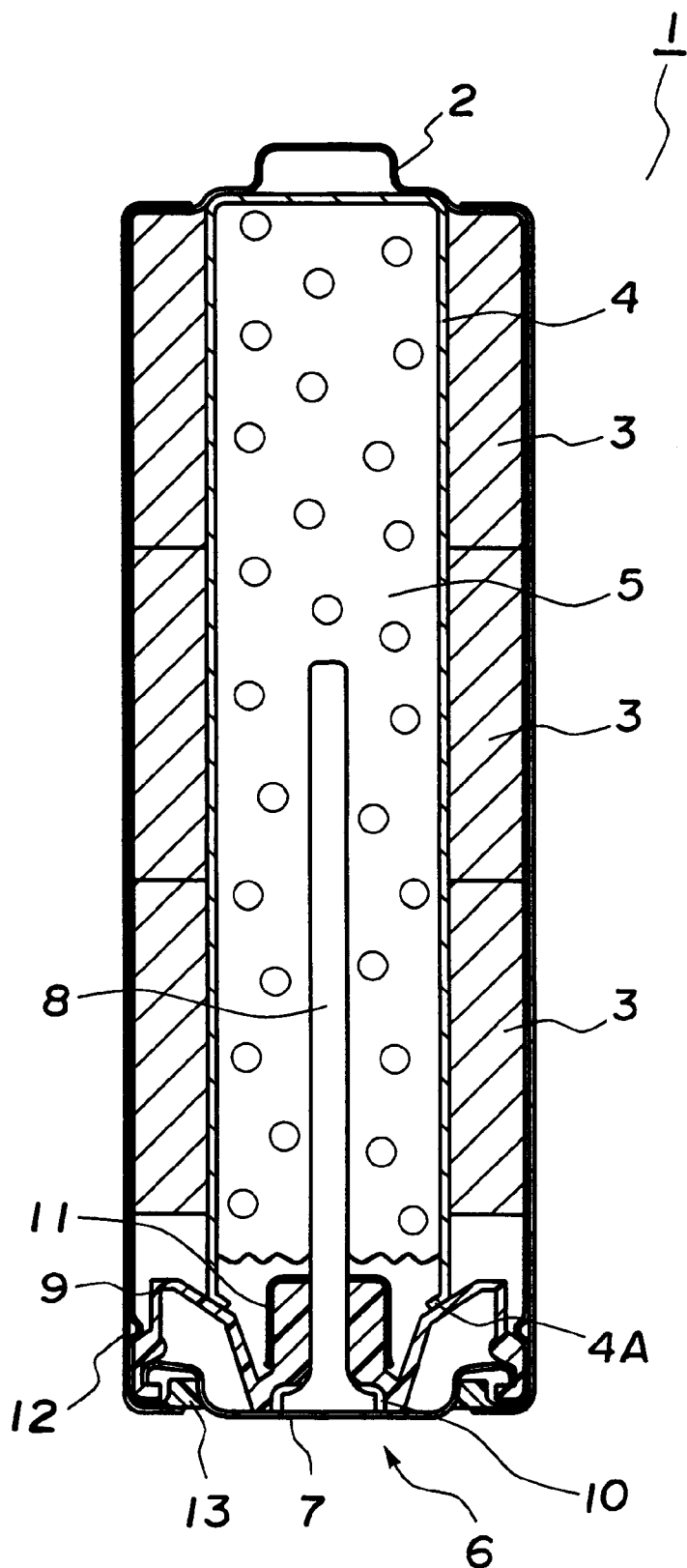
FIG. 1 is a sectional elevation of an alkaline cell to which a separator of the present invention is mounted.

With reference to FIG. 1, an annular shaped cathode active mass 3 is prepared by preparation of a cathode active mass powder which consisted of mixture of 92 percent by weight of manganese dioxide $MnO_2$, 5 percent by weight of graphite, 2.5 percent by weight of 40% potassium hydroxide aqueous solution, and 0.5 percent by weight of binder and three of the thus formed annular shaped cathode active masses 3 were disposed in a cathode metal casing 2.

Then a separator 4 of the present invention was inserted into the cathode mix consisting of three cathode masses 3.

The separator 4 was formed by rotating a roll of a separator base paper 21 in the horizontal direction to pull the base paper from the roll to cut into a rectangular shape having a length of 81 mm and a width of 56 mm. The base paper 21 was made of vinylon fiber/rayon fiber/vinylon binder and had a thickness of 120 $\mu$m and width of 56 mm and was wound into a roll. Then the separator base paper 21 was rotated in the horizontal direction by a mandrel (not shown) to form a cylindrical formation of three (3) windings and then the cylindrical formation was subject to a heat bonding at a barrel or a side portion and a bottom portion to form a cylindrical structure with a closed end and having an outer diameter of 8.8 mm and a height of 48 mm.

After a tensile strength test was made with respect to a rectangular separator base paper having a size of 200 mm (length)×15 mm (width), a desirable base paper was selected which has a tensile strength of 4.5 kg in a longitudinal direction and a tensile strength of 3.0 kg in a widthwise direction and a ratio of 1.5/1.

Then, 1.1 ml of 40% potassium hydroxide aqueous solution was supplied to the separator 4 and aging was made to keep the separator stand still to thereby permit he separator 4 and the cathode mix 3 to be wetted by the potassium hydroxide.

A gel-like anode active mass 5 was then filled in a space confined by the separator 4. The gel-like anode active mass 5 was prepared by the mixture of 69 percent by weight of zinc powder, 0.4 percent by weight of polyacrylic acid, 1.1 percent by weight of zinc oxide, and 30.5 percent by weight of 40% potassium hydroxide aqueous solution.

Then, a current collector 8 was inserted into the gel-like anode active mass 5 of zinc and a gasket 9 was pressed against an extended end 4A of the separator 4 to bend the end 4A inwardly and, at the same time, an end of the opening of the cathode metal casing 2 was caulked inwardly so that an outer end of the gasket 9 was clamped between an outer circumferential portion of the anode terminal plate 7 and an end of the cathode metal casing 2, and the opening portion of the cathode metal casing 2 was closed by a closure body 6.

Then, a label 12, which has recently replaced a conventional metal jacket for the purpose of increasing the inner volume of the cell and is also called as "shrink tack label" and simply "label", was provided on an outer surface of the cathode metal casing 2, and an anode side insulating washer 13 was disposed between an outer circumferential portion of the anode terminal 7 and the label 12 of the cathode metal casing 2.

Then, 50 alkaline dry cells 1 thus prepared were dropped at the gravity of 500 G with the anode terminal plate 7 being facing downward and an inner short circuit was inspected and no cell was found which has any inner short circuit.

Example 2

A separator base paper 21, which is similar with that of the previous Example 1 except the following was used and 50 dry cells were prepared. Namely, a separator base paper 21 was subjected to a tensile strength test with respect to a rectangular sheet having a size of 200 mm (length)×15 mm (width) and a base paper was used which had a tensile strength of 4.5 kg in a longitudinal direction and a tensile strength of 2.2 kg in a widthwise direction and a ratio of both is 2.0/1 and a drop test was carried out and found no inner short circuit with respect to 50 cells.

Example 3

A separator base paper 21, which is similar with that of the previous Example 1 except the following was used and 50 dry cells were prepared. Namely, a separator base paper 21 was subjected to a tensile strength test with respect to a rectangular sheet having a size of 200 mm (length)×15 mm (width) and the base paper was used which had a tensile strength of 4.5 kg in a longitudinal direction and a tensile strength of 3.6 kg in a widthwise direction and a ratio of both is 1.1/1 and a drop test was carried out and found no inner short circuit with respect to 50 cells.

Comparative Example 1

Figure 2:
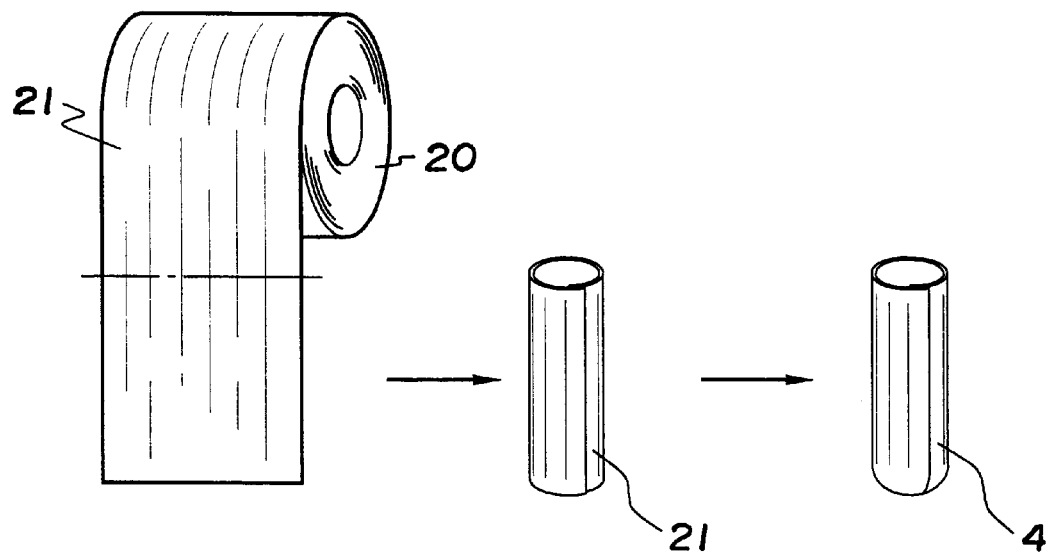
FIG. 2 is a diagram showing an example of a method of forming a separator for a cell in the prior art.

A comparative example was made with reference to the conventional separator, which was prepared as shown in FIG. 2. The separator base paper 21 which was rolled as shown in FIG. 2 was rotated in a vertical direction and drew an end of the base paper 21 in a longitudinal direction and then cut to a predetermined length. Then, the base paper 21 was rotated in a horizontal direction by means of a mandrel to form a cylindrical structure and then its end portions and bottom portion were heat treated to be adhered with each other to form a cylindrical separator 4 having a closed bottom end.

A separator base paper 21, which is similar with that of the previous Example 1 except the following was used and 50 dry cells were prepared. Namely, a separator base paper 21 was subjected to a tensile strength test with respect to a rectangular sheet having a size of 200 mm (length)×15 mm (width) and a base paper was used which had a tensile strength of 4.5 kg in a longitudinal direction and a tensile strength of 1.7 kg in a widthwise direction and a ratio of both is 2.7/1 and a drop test was carried out and found no inner short circuit with respect to 50 cells.

Comparative Example 2

A separator base paper 21, which is similar with that of the previous Example 1 except the following was used and 50 dry cells were prepared. In this comparative example 2, a separator base paper 21 was subjected to a tensile strength test with respect to a rectangular sheet having a size of 200 mm (length)×15 mm (width) and a base paper was used which had a tensile strength of 4.5 kg in a longitudinal direction and a tensile strength of 1.7 kg in a widthwise direction and a ratio of both is 2.7/1 and a drop test was carried out. In this comparative example (Comparative Example 2), the separator was made in the method shown in FIG. 3. The result was that inner short circuits were found in seven (7) cells among the 50 cells.

Figure 3:
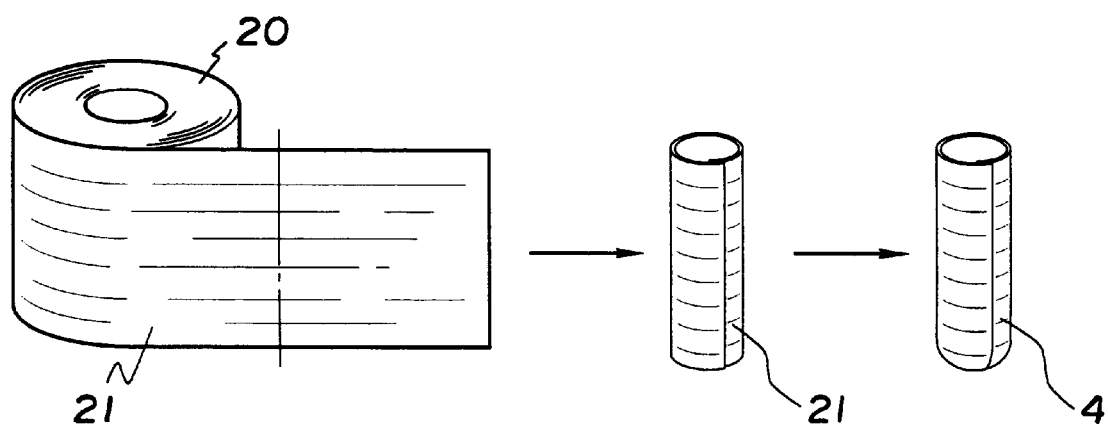
FIG. 3 is a diagram showing another example of a method of forming a separator for a cell in the prior art.
Figure 4A:
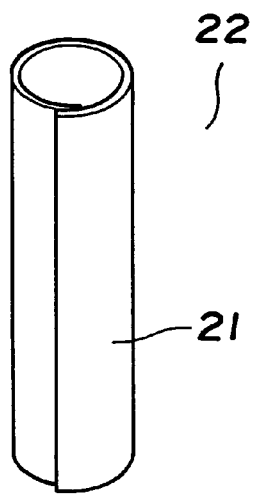
FIGS. 4A, 4B, 4C, 4D and 4E are diagrams showing the steps of forming a separator in the prior art.
Figure 4B:
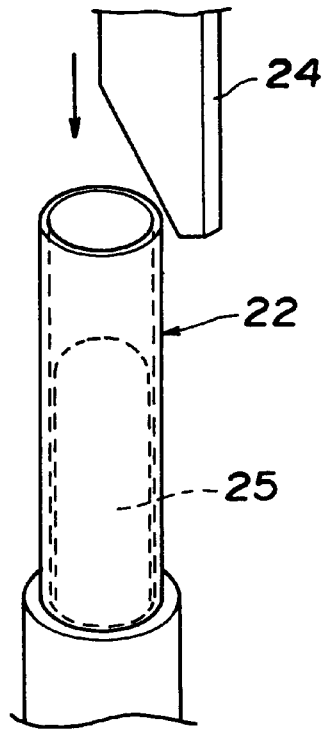
Figure 4C:
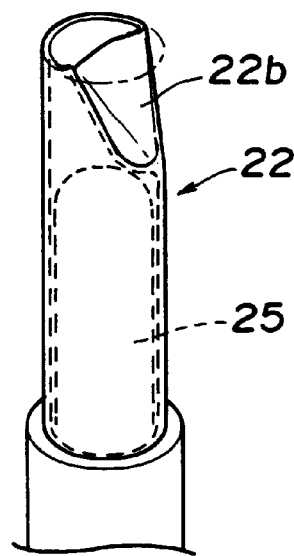
Figure 4D:
Figure 4D:
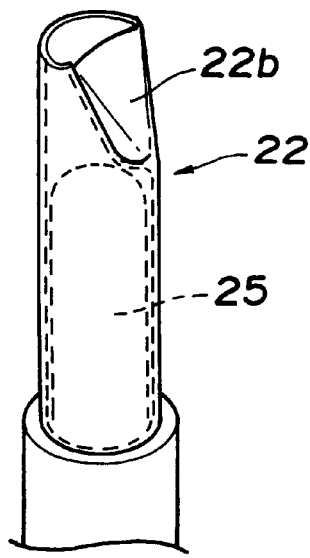
Figure 4E:
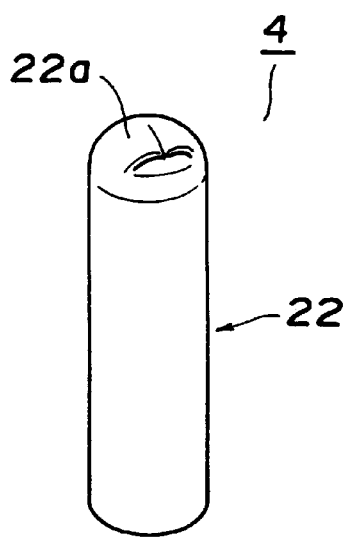

From the test results described above, it was found that the separators which were produced by the conventional method shown in FIG. 2 showed no inner short circuit even when a ratio between a longitudinal tensile strength and a widthwise tensile strength of a separator base paper 21 is more than two (2). However, on the other hand, the separators 4 produced in accordance with the method shown in FIG. 3 showed inner short circuits if the ratio between the longitudinal tensile strength and the widthwise tensile strength is more than two (2) and no short circuit was found if the ratio was less than two (2) inclusive.

According to the present invention, a ratio of the longitudinal tensile strength and the widthwise tensile strength is determined in the range of 2/1 to 1/1. Therefore, also in the case that the separator is made, as shown in FIG. 3, by rotating a rolled separator base paper in a horizontal direction to pull out the base paper and cut to a predetermined length, and rotating the pulled out separator base paper in horizontal direction to form a cylindrical separator structure and then bending an end of the cylindrical separator structure radially inwardly, a deformation in the end portion of the separator can be prevented. Consequently, generation of inner short circuit can be prevented even when an outer force such as vibration and shock is added to the cell. Therefore, the productivity of the separator and the cell itself can be increased without production failure of the separator.

2. Production Method of the Separator

Next, the method of producing the separator according to the present invention will be described.

With reference to FIG. 5A, a hoop like base paper 21 which contains a water soluble binder is prepared and water is sprayed to the predetermined three portions which correspond to an upper end of a winding end, a central portion of the winding end and a lower end portion of the winding end, of a wound tubular separator structure, which will be described presently, by using a nozzle 30. In this case, a length of the area to which the water is sprayed is selected to be larger than an entire circumferential length of a cylindrical body 22. If necessary, a small amount of water-soluble binder can be added to the water.

After that, the base paper 21 is cut to a predetermined length and wound around a mandrel 32 to form a cylindrical body 22 as shown in FIG. 5B. At this moment, water contained in the sprayed portions of the tubular separator structure is evaporated by pressing a heat plate (not shown) against the water-contained portions described above. Then, the water soluble binder is then solidified by evaporation of the water in the base paper 21, so that the cylindrical body 22 is cured and held as it is with its cylindrical shape being maintained. The cured portions (that is, the area to which water is sprayed) are three points, that is, upper portion, middle portion and lower portion, respectively, of the winding end of the cylindrical body 22 and, in addition to the above, the length of the each of the water sprayed areas is substantially equal to or longer than the circumferential length of the tubular body 22. Thus, the predetermined cylindrical shape of the cylindrical body 22 is fixed as desired.

In FIG. 5C, the thus formed cylindrical body 22 is released from the mandrel 32 and inserted into a holding hole 33a of a cylindrical clamping jig 33. The holding hole 33a has a diameter which is substantially equal to, or slightly larger than, an outer diameter D1 of the cylindrical body 22 and a length which is longer than half of the length L1 of the cylindrical body 22 and, therefore the cylindrical body 22 can be reliably secured by the cylindrical clamping jig 33. The cylindrical body 22 thus secured by the cylindrical clamping jig 33 is then displaced to a bottom-forming step, and this displacement is made while the cylindrical body 22 is being secured by the cylindrical clamping jig 33 and, therefore, there will be no fear or danger of producing deformation and/or damages at an open end portion of the cylindrical body 22 by mechanical forces (such as shocks and vibrations) and/or its own weight during the displacement.

Then, the process is moved to a bottom-forming step and while the cylindrical body 22 is being held by the cylindrical jig 33, a shaft 25 is used to hold the cylindrical body 22 in the height and radial directions and one end of the cylindrical body 22 is heat-bonded to close the end as shown in FIGS. 6A to 6C. Specifically, with reference to FIG. 6A, a rod-like jig 27 is pressed obliquely against an upper end of the cylindrical body 22 so that a half part 22c of the annular, upper end of the cylindrical body 22 is depressed as shown in FIG. 6B in such a manner that the depressed portion 22c is bent and folded at right angles relative to the lengthwise direction of the cylindrical body. At this moment, as shown in FIG. 7, care is taken so that a folded length L2 of the depressed portion 22c is greater than an inner diameter D2 of the cylindrical body 22. In this state, a heat curl mold 29 is pressed against a top of the cylindrical body 22 to proceed a heat bonding as shown in FIG. 6C to thereby form a semi-spherical bottom portion 22a at the upper end of the cylindrical body 22. Since the depressed portion 22c is folded at right angles as described above, a reaction of the depressed portion 22c can be restricted and, therefore, a sealing or closing effect of the bottom portion 22a can make improved regardless of hardness or other physical characteristics of the cylindrical body 22. Further, as described above with reference to FIG. 7, the folded length L2 of the depressed portion 22c is set to be larger than the inner diameter D2 of the cylindrical body 22 and, therefore, the folded portion of the depressed portion 22c extends to fully contact against and engage with the opposite inner wall of the cylindrical body 22. Therefore, a reactive force of the folded upper end portion of the cylindrical body 22 is considerably restricted and, therefore, a sealing or closing property of the bottom portion 22a can be assured. Besides, in the bottom-forming step, the cylindrical body 22 is still maintained to be inserted into the cylindrical molding jig 33, the cylindrical body can be held still without any displacement or slipping movement during the bottom-forming step.

Thus, the separator of the present invention is completed. In the present invention, the cylindrical body 22 is maintained to be inserted into the cylindrical clamping jig 33 from the initial step of forming the cylindrical body 22 to the bottom-forming step and, therefore, the initial shape of the cylindrical body can be maintained as desired and consequently the productivity of the separator 6 can be increased.

Examples of the production of the separator will be described.

Example A 20 percent by weight of vinylon fiber and 65–75 percent by weight of pulp fiber were mixed together, and to this mixture 15–5.0 percent by weight of water soluble binder of polyvinyl alcohol series was added to prepare a base paper having a thickness of 120 μm.

By using this base paper, separators for UM-3 type alkaline dry cells were produced by the method of the present invention described above. Production of the separators was carried out at a production speed of 600 separators per minute.

Comparative Example

A base paper produced by the Example A mentioned above was used and separators for UM-3 type alkaline dry cells were produced by the conventional, known method. Production was carried out at a production speed of 300 separators per minute, that is, a half of the production of Example A.

Visual Appearance Tests

Visual appearance tests were made to the thus formed separators according to the present invention and the separators of the conventional prior art. The results were that about five (5) separators per minute (that is, about 1.7%) were found to be inappropriate and, by contrast, no inappropriate result was found with respect to the separators of the present invention. This test results show that the present invention can provide a favorable production rate (productivity) with less percentage of rejects in spite of the fact that the production speed was increased two times of the conventional method.

Sealing Test of the Bottom End

For the purpose of comparing sealing (closing) properties of the bottom portion of the separators, 10,000 alkaline cells of UM3-type employing the separators according to the present invention and 10,000 alkaline cells of the same type employing the separators according to the conventional method were prepared and placed still for 20 days at 60° C. and deterioration test was made with respect to the open circuit voltage. It was found that voltage deterioration was seen in three (3) cells per 10,000 cells (that is, 0.03%) with respect to the cells, which employ the conventional separators, but, on the other hand, no deterioration of voltage was found in the cells which employ the separators of the present invention. Therefore, it will be concluded that the separators of the present invention provide more desirable sealing properties relative to the conventional separators.

According to the present invention, the production method has the steps of: winding a base paper 21 for a separator to form a cylindrical body 22; subjecting the thus formed cylindrical body 22 to a closed bottom forming step while the cylindrical body 22 is held by a cylindrical clamping jig 33 to maintain its cylindrical shape, heat treating an end of the cylindrical body to close the end to thereby form a closed end, and releasing the cylindrical body 22 from the cylindrical clamp jig 33.

According to the production method of the present invention, the cylindrical body can be held by the cylindrical clamping jig 33 from the initial step of forming the cylindrical body 22 and to the final step of forming closed the bottom end and, therefore, the predetermined shape of the cylindrical body can be maintained. Thus, the production method of the present invention can increase the productivity of the separator and of the cells.

In the method described above, it is preferred that the cylindrical clamping jig 33 has a holding hole 33a having a diameter which is substantially same as or slightly larger than an outer diameter D1 of the cylindrical body 22, and a length which is larger than a half of a length L1 of the cylindrical body 22. This embodiment still assures to maintain the shape of the cylindrical body 22 and, therefore, a productivity of the separators can be improved further.

In the other preferred embodiment, the cylindrical body 22 is formed such that water is sprayed to a predetermined portion of the base paper which contains a water soluble binder, and the base paper is then wound to a cylindrical form. The heat plate is applied to a predetermined water-sprayed portion of the cylindrically formed base paper to evaporate the water and, at the same time, to proceed heat-bonding of the base paper 21. The water-soluble binder may be selected from polyvinyl alcohol (PVA), polyacrylic sodium (NaPA), etc. In this embodiment, the water soluble binder content is solidified by evaporation of water in the base paper 1 and the cylindrical body 22 maintains its cylindrical shape and, therefore, generation of deterioration in visual appearance of the separator can be restricted. Thus, productivity of the separator can be increased.

In the preferred embodiment, the upper and lower two portions of the winding end of the cylindrical body 22 are sprayed with water so that the sprayed portion has a length which is longer than an actual circumferential length of the cylindrical body. This will assure to maintain the shape of the cylindrical body 22 and generation of deterioration in visual appearance can be minimized.

In the further preferred embodiment of the invention, when the cylindrical body 22 is closed by a heat treatment, a rod-like jig 27 may be obliquely pressed against the end of the cylindrical body 22 to depress one side portion 22c of the end of the cylindrical body 22 and bend and fold the portion 22c at right angles and, at this moment, a heat curl die 29 is pressed against the one end of the cylindrical body 22 to proceed a heat bonding. In this embodiment, a reaction of one end portion 22c of the cylindrical body 22 is restricted so that sealing properties of the bottom end portion 22a by the heat bonding is improved and the productivity of the separator and the cell can be increased.

Further, in the present embodiment of the present invention, a length L2 of the folded portion of the cylindrical body 22 is determined to be longer than an inner diameter of the cylindrical body 22. This will permit the one end portion 22c to be contacted with the other end portion and, therefore, sealing effect of the bottom portion 22a by the heat bonding can be improved further.

Although the present invention has been described with reference to the preferred embodiments thereof, many modifications and alterations may be made within the scope of the appended claims.

What is claimed is:

1. A method of producing a separator for an alkaline cell, comprising the steps of:

winding a base paper for a separator to form a cylindrical body, subjecting the thus formed cylindrical body to a closed bottom forming step while the cylindrical body is held by a cylindrical clamping jig device to maintain its cylindrical shape, heat treating an end of the cylindrical body to close the end to thereby form a closed end, and releasing the cylindrical body from the cylindrical clamping jig device, wherein when the end of the cylindrical body is closed by the heat treating, a rod-like jig is pressed against the end of the cylindrical body obliquely relative to a longitudinal axis of the cylindrical body to depress one side portion of the end of the cylindrical body to bend and fold the portion at right angles and, at this moment, a heat curl die is pressed against the end of the cylindrical body to perform a heat bonding.

2. A method of producing a separator for an alkaline cell according to claim 1 wherein the cylindrical clamping jig device has a holding hole having a diameter which is substantially same as or slightly larger than an outer diameter D1 of the cylindrical body, and a length which is larger than a half of the length L1 of the cylindrical body.

3. A method of producing a separator for an alkaline cell according to claim 2, wherein upper and lower portions of a winding end of the cylindrical body are sprayed with water so that the sprayed portion has a length, which is longer than an actual circumferential length of the cylindrical body.

4. A method of producing a separator for an alkaline cell according to claim 1, wherein the cylindrical body is formed such that water is sprayed to a predetermined portion of the base paper, and the base paper is then wound to a cylindrical form, and a heat plate is applied to a predetermined water-sprayed portion of the cylindrically formed base paper to evaporate the water and, at the same time, to proceed hot press bonding of the base paper.

5. A method of producing a separator for an alkaline cell according to claim 1, wherein a length L2 of the folded potion of the cylindrical body is longer than an inner diameter of the cylindrical body.

* * * * *